United States Patent

Davis

[15] 3,663,085
[45] May 16, 1972

[54] STEREOSCOPIC VIEWING APPARATUS WITH SINGLE-AXIS OPTICAL SYSTEM WITH CONVENTIONAL OBJECT LENS

[72] Inventor: Allen V. C. Davis, 5600 Alta Canyada, La Canada, Calif. 91011

[22] Filed: Oct. 1, 1970

[21] Appl. No.: 77,273

Related U.S. Application Data

[63] Continuation-in-part of Ser. No. 773,897, Nov. 6, 1968, abandoned.

[52] U.S. Cl. .................................................. 350/132, 352/60
[51] Int. Cl. ................................. G02b 27/26, G03b 35/22
[58] Field of Search .................................. 350/132; 352/60

[56] References Cited

UNITED STATES PATENTS 2,241,041  5/1941  Sauer .................................... 350/132

1,843,663  2/1932  Cregier .................................. 350/132

FOREIGN PATENTS OR APPLICATIONS 61,545  5/1955  France .................................... 352/60
1,034,453  7/1953  France .................................... 352/60

*Primary Examiner*—David Schonberg
*Assistant Examiner*—Paul A. Sacher
*Attorney*—Perry E. Turner

[57] ABSTRACT

For an illuminated object projected onto a screen through an optical system having a single object lens, light reflected from the object reaches the object lens through right and left polarizers and wherein the polarizing crystals in each are oriented at right angles to those in the other. The projected image is viewed through a second pair of right and left polarizers, shown as eyepieces in frames to be worn as glasses. Due to the combined effects of the polarizers, the image seen through the eyepieces appears three dimensional.

1 Claim, 3 Drawing Figures

PATENTED MAY 16 1972

3,663,085

INVENTOR
ALLEN V. C. DAVIS
BY
Perry E. Turner
ATTORNEY

STEREOSCOPIC VIEWING APPARATUS WITH SINGLE-AXIS OPTICAL SYSTEM WITH CONVENTIONAL OBJECT LENS

CROSS-REFERENCE TO RELATED APPLICATION

This application is a continuation-in-part of my application, STEREOSCOPIC VIEWING APPARATUS WITH SINGLE-AXIS OPTICAL SYSTEM WITH CONVENTIONAL OBJECT LENS, Ser. No. 773,897, filed Nov. 6, 1968 and now abandoned.

BACKGROUND OF THE INVENTION

1. Field of the Invention

This invention relates to stereoscopic viewing system.

2. Description of the Prior Art

It is known that an object viewed through a single-axis optical system is seen as two dimensional. Such a plan view is not tolerable in many industrial applications, where operations must be performed on or with a small physical object. A typical example involves locating, positioning and soldering wire connections in an electrical network. If all of a number of crisscrossed wires appears to be in the same plane, it is not possible to select and manipulate any one of them with any assurance of its position relative to the others.

In accordance with known prior art teachinges, two dimensional objects, e.g., objects in a film frame, can be viewed as three dimensional with a double axis optical system, but not with a single optical system. However, the images are confused due to the formation of two images with overlapping and non-overlapping portions.

SUMMARY OF THE INVENTION

My invention embraces a stereoscopic viewing apparatus wherein a three-dimensional, i.e., real, object is seen as three dimensional with a single-axis optical system using a conventional object lens.

DESCRIPTION OF PREFERRED EMBODIMENT

Figure 1:
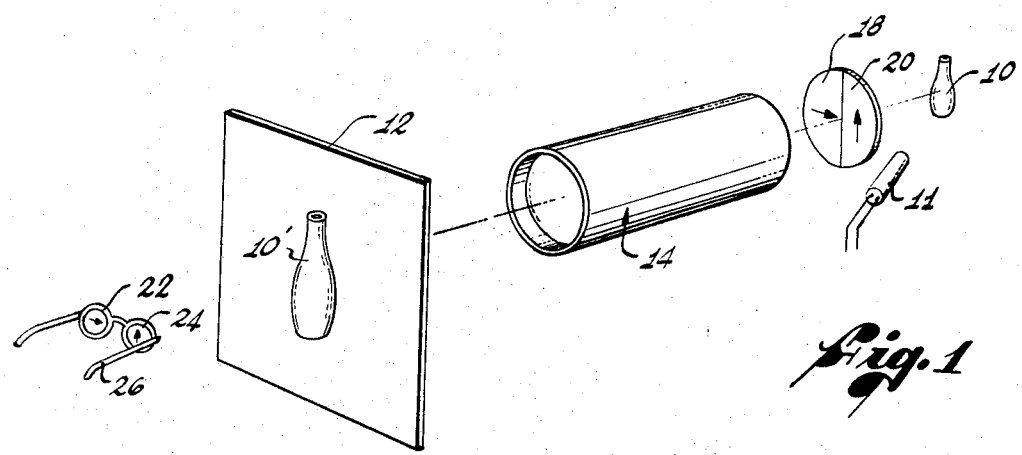
FIG. 1 is an exploded view of my invention for stereoscopic viewing of the image of an object that is projected onto a screen with a single optical system.

Referring to FIG. 1, a conventional projecting means is shown between a real object 10 illuminated by a suitable source 11 and a screen 12 for projecting a magnified image of the object onto the screen. The projecting means includes a single-axis optical system, indicated at 14, which preferably is one having objective and ocular lens elements to cause an erect image 10' of the object to appear on the screen. In this connection, the axis of the lens elements may pass through the object and the screen as in FIG. 1, or, as in a so-called episcopic projector, the optical system may be placed above the object, and suitable mirror means employed to cause the image to be projected onto the screen.

In accordance with this invention, the projecting means and screen 12 are located between two pairs of polarizers, here shown as a disc formed of a pair of coplanar elements 18, 20 located between the optical system 14 and the object 10, and a pair of elements 22, 24 forming the eyepieces in glass frames 26. Each of the polarizers adjacent the object lens is adapted to pass only light that is polarized in a direction at right angles to that passed through the other. In the example of FIG. 1, arrows indicate the left-hand element 18 as a horizontal polarizer, and the right-hand element 20 as a vertical polarizer.

The left and right lens elements 22, 24 are similarly arranged, i.e., one is a vertical polarizer and the other is a horizontal polarizer. In this example, i.e., where the image is an erect image, the left element 22 is polarized the same as the left element 18, and the right element 24 is polarized in the same direction as the right element 20. If the projecting means caused an inverted image to appear on the screen, the left element 22 would be a vertical polarizer, and the right element 24 a horizontal polarizer.

Figure 2:
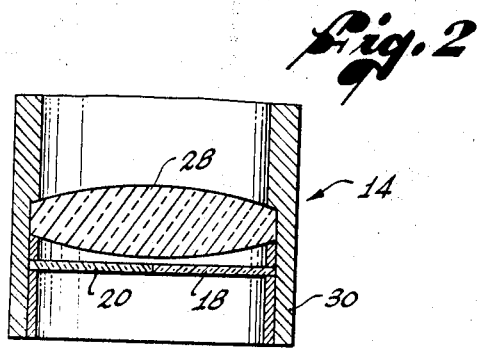
FIG. 2 is a fragmentary sectional view of a lens and polarizers holder suitable for holding a disc of polarizer elements adjacent an object lens.

Preferably the polarizers 18, 20 are placed as nearly as practicable to the object lens. In this connection, and referring to FIG. 2, an object lens 28 is shown supported in a sleeve holder 30 adjacent its open end, and the disc formed of the elements 18, 20 is positioned in the open end of the holder so that its center is immediately adjacent the center of the object lens.

Figure 3:
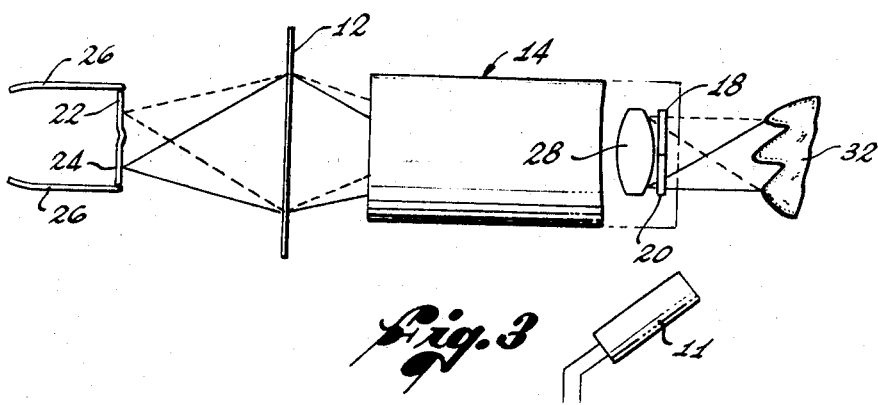
FIG. 3 is an optical diagram to aid in explaining the operation of the invention.

With the above-described arrangement and a real object illuminated by white light, a person wearing the frames 26 and looking through the eyepieces 22, 24 visually perceives the image 10' as a three-dimensional image in color, i.e., as an enlarged three-dimensional version of the object 10. To aid in understanding this phenomenon, it should be noted that light rays reflected from each point on an object pass through both polarizers 18, 20. However, rays from each such point enter the respective polarizers from different angles. This is illustrated in FIG. 3, in which dotted and solid lines from each portion of a three-dimensional object 32 are shown entering the respective polarizers.

Since rays from each portion pass through both polarizers 18, 20, they emerge from the lens system and appear on the screen as rays of different intensities. Optical discrimination of these rays is effected through the eyepieces 22, 24, so that the object on the screen is seen as three dimensional.

Figure 4:
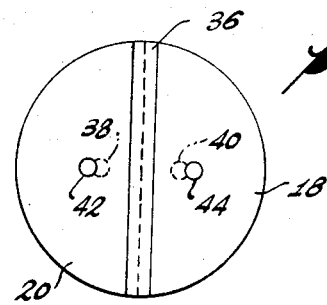
FIG. 4 is a plan view of the disc of disc polarizer elements having its center portion masked.

Further in this connection, it should be noted that the centroids of ray energy reaching the polarizers 18, 20 are substantially displaced from the diameter of the disc formed thereof. These points of mean energy can be further spaced by masking strip 36 (FIG. 4) which spans the abutting edge portions of the polarizers 18, 20. The dotted circles 38, 40 illustrate the centroids without the opaque strip 36, and the solid circles 42, 44 indicate they are shifted further out as a result of such masking. This causes the system to function so that each portion of the object appears to be viewed as from greater angles, and further enhances the three-dimensional effect.

While flat elements are preferred for the polarizers, it will be apparent that this invention embraces the use of other polarizer devices, e.g., prism polarizers. Further, it should be noted that the screen 12 would not be present in certain arrangements, e.g., a microscope with a single optical system. In this latter connection, the microscope has two eyepieces through which to view the magnified image created by the objective and ocular lenses.

Still further, elements for the polarizers may be formed other than as shown. For example, the polarizers 18, 20 may be elements which are in surface-to-surface contact with the confronting portion of the lens element of the objective lens system. Further in this regard, the elements may be coated onto such lens surface.

I claim:

1. Stereoscopic viewing apparatus for a real three-dimensional object that is illuminated to cause light rays to be reflected therefrom, comprising:

means defining a single-axis optical system including positioned an object lens at the end nearest the three-dimensional object in the path of the reflected rays, which system creates a magnified image of the object in a plane;

and two pairs of left and right polarizers, one pair being located proximate the object lens and in the path of rays reflected from said object, the other pair being located so that said magnified image in said plane is viewed through said other pair, said one pair being orthogonal polarizers, rays from each point on the object passing through both polarizers of said one pair and said object lens, the remaining pair being orthogonal polarizers, and said pairs of polarizers combining to effect a convergence of each point of the object in said plane when viewed through said other pair, whereby each point of the image is effectively seen at different angles through the polarizers of said other pair, the portion of the polarizers of said one pair through which rays from said three-dimensional object pass being separated by an opaque screen.

* * * * *